July 15, 1930.  J. SAUER  1,770,808
ARC WELDING APPARATUS
Filed Sept. 6, 1927
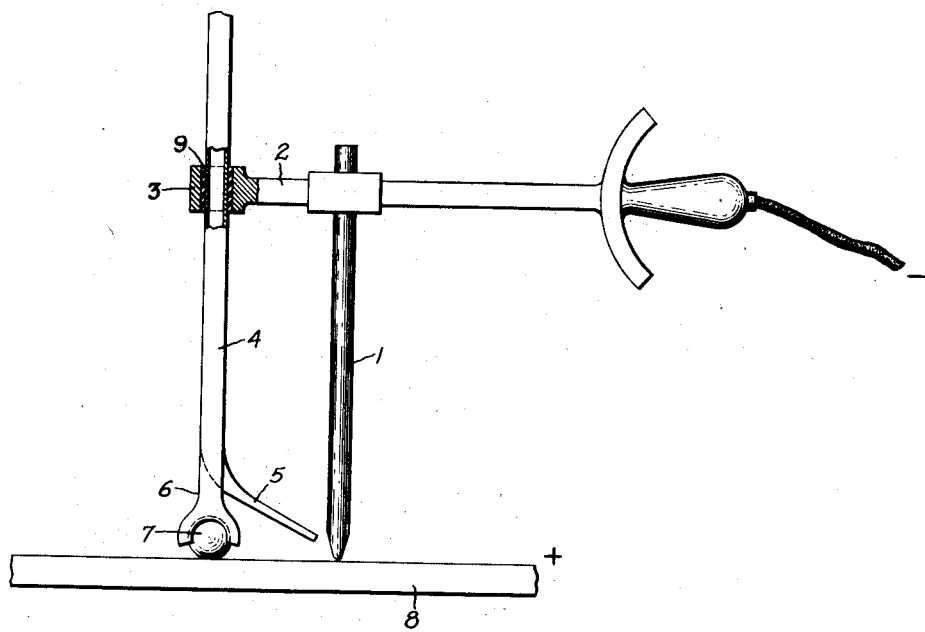
Inventor:
Julius Sauer
by
His Attorney Patented July 15, 1930

1,770,808

UNITED STATES PATENT OFFICE

JULIUS SAUER, OF KARLSHORST-BERLIN, GERMANY, ASSIGNOR TO GENERAL ELECTRIC COMPANY, A CORPORATION OF NEW YORK

ARC-WELDING APPARATUS

Application filed September 6, 1927, Serial No. 217,563, and in Germany September 21, 1926.

My invention relates to apparatus for use in welding, fusing or melting metals.

More particularly, my invention relates to a device for use in welding by the electric arc process wherein the welding operation is conducted in a protective medium such as hydrogen, hydrogen and nitrogen or some other suitable medium.

According to the present invention, the protective gas or substance which in itself or in the heat of the arc forms a protective covering about the arc and molten weld metal is fed to the arc through a feed pipe that is slidably supported in a suitable electrode holder and upon the work in such a manner as to permit a relative movement between the pipe and the electrode holder in the direction of the electrode to compensate for its consumption in the arc while at the same time permitting the electrode holder to carry the feed pipe in the direction of welding with its discharge end in front of and in proximity to the arc.

My invention will be better understood from the following description taken in connection with the accompanying drawing, and its scope will be pointed out in the appended claims.

The single figure of the drawing illustrates one embodiment of my invention.

In the embodiment illustrated in this figure the welding electrode 1 is clamped in an electrode holder 2 in any suitable manner. The electrode holder is provided with a sleeve 3 which slidably embraces a feed pipe 4 provided at its discharge end with a nozzle portion 5 bent in towards the arcing tip of the electrode 1. By means of support 6 running on a roller or ball 7 the pipe 4 is carried by the work 8 upon which the roller or ball rests. The sleeve 3 is electrically insulated from the feed pipe 4 by an insulating bushing or a layer of insulation 9. The feed pipe 4 is capable of sliding freely within the sleeve 3 and bushing 9 so that the electrode holder 2 may be moved toward the work as the electrode 1 is consumed in the arc without altering the relative position of the nozzle 5 with respect to the point of welding. The feed pipe 4 may be suitably shaped to prevent it from turning in the sleeve 3 and bushing 9.

Instead of providing insulation at 9 as described, it is, of course, apparent that suitable insulation may be interposed between the portion of the electrode holder between the sleeve 3 and the portion of the holder that is adapted to hold the electrode 1 or that the roller or ball 7 may be made of some suitable insulating material. It is also apparent that several nozzles may be arranged on one support and that several feeding pipes may be supported in a single electrode holder.

The arrangement illustrated besides permitting the welding operation to be conducted in a protective medium also acts in a manner to render the weld metal less porous. The gas jet, it will be noted, will be directed onto the arc in a manner to throw the arc flame consisting of gases of extremely high temperature onto the solidifying edge of the arc crater as the welding operation is performed. In this way the speed of solidification of the weld metal will be retarded and the dissolved gases will have ample opportunity to escape from the solidifying metal.

What I claim as new and desire to secure by Letters Patent of the United States, is,—

1. An electrode holder for use in fusing work parts by means of the electric arc having associated therewith a feed pipe for discharging a medium about the arc maintained between an electrode in said holder and the work parts, and means adapted to rest upon the work parts for positioning the discharge end of said feed pipe in proximity to the arc.

2. In apparatus for electric arc welding, the combination with an electrode holder of a feed pipe for discharging a protective medium, a support for said feed pipe adapted to rest upon the work for positioning the discharge end of said feed pipe in proximity to the arc, and means for slidably mounting said pipe in said electrode holder.

3. In apparatus for electric arc welding, the combination with an electrode holder of a feed pipe for discharging a protective medium, a support for said feed pipe adapted to rest upon the work for positioning the discharge end of said feed pipe in front of and in proximity to the arc, means for slidably mounting said pipe in said electrode holder, and means for electrically insulating said said pipe in said electrode holder.

4. In apparatus for electric arc welding, the combination with an electrode holder of a feed pipe for discharging a protective medium having its discharge end bent in toward the arcing terminal of the electrode supported by said electrode holder, a support for said feed pipe adapted to rest upon the work for positioning the discharge end of said feed pipe in proximity to the arc, and an electrically insulating bushing in said electrode holder for slidably securing said pipe in said electrode holder.

In witness whereof, I have hereunto set my hand this fourth day of August, 1927.

JULIUS SAUER.